United States Patent [19]

Yu

[11] Patent Number: 5,474,268

[45] Date of Patent: *Dec. 12, 1995

[54] AGRICULTURAL AND INDUSTRIAL TIE

[76] Inventor: Michael Yu, 1270 Shakespeare Dr., Concord (Contra Costa), Calif. 94521

[*] Notice: This portion of the term of this patent subsequent to Apr. 20, 1999, has been disclaimed.

[21] Appl. No.: 410,084

[22] Filed: Mar. 24, 1995

Related U.S. Application Data

[63] Continuation of Ser. No. 100,914, Aug. 2, 1993, abandoned, which is a continuation-in-part of Ser. No. 24,182, Feb. 26, 1993, abandoned, which is a continuation-in-part of Ser. No. 991,727, Dec. 17, 1992, abandoned, which is a continuation-in-part of Ser. No. 924,191, Aug. 3, 1992, abandoned, which is a continuation-in-part of Ser. No. 834,149, Feb. 10, 1992, abandoned.

[51] Int. Cl.$^6$ ..................................................... E21F 17/02
[52] U.S. Cl. ........................... 248/61; 248/62; 248/74.1
[58] Field of Search .............................. 248/49, 51, 58, 248/61, 62, 63, 71, 72, 74.1, 316.1, 313, 316.5; 24/20 EE, 20 TT, 20 R; 285/252; 403/397

[56] References Cited

U.S. PATENT DOCUMENTS

| 106,527 | 8/1870 | Woodruff | 24/20 EE |
|---|---|---|---|
| 355,493 | 1/1887 | Wiley. | |
| 1,141,316 | 6/1915 | Cockrell | 248/61 |
| 1,164,613 | 12/1915 | Jewell. | |
| 1,242,027 | 10/1917 | Olmsted. | |
| 1,476,764 | 12/1923 | Morhoff et al. | 248/71 |
| 2,303,108 | 11/1942 | Blackburn | 248/61 |
| 2,405,912 | 8/1946 | Tinnerman | 24/20 |
| 2,417,269 | 3/1947 | Robertson | 248/61 |
| 2,942,819 | 6/1960 | Brogan | 248/58 |
| 3,286,694 | 11/1966 | Landy | 119/103 |
| 3,605,200 | 9/1971 | Vallinotto et al. | 24/20 TT |
| 3,606,651 | 9/1971 | Goodman | 24/255 BS |
| 3,893,647 | 7/1975 | Kennedy | 248/68 R |
| 3,913,187 | 10/1975 | Okuda | 24/255 |
| 3,925,851 | 12/1975 | Bevans | 24/20 TT |
| 4,128,918 | 12/1978 | Wenk | 24/16 R |
| 4,183,120 | 1/1980 | Thorne | 24/16 R |
| 4,483,556 | 11/1984 | LiVolsi | 285/252 |
| 4,557,024 | 12/1985 | Roberts et al. | 24/20 TT |
| 4,564,163 | 1/1986 | Barnett | 248/71 |
| 4,601,450 | 7/1986 | Lindquist | 248/71 |
| 4,674,720 | 6/1987 | Fetsch | 248/74.1 |
| 4,724,583 | 2/1988 | Ojima | 24/20 R |
| 4,773,129 | 9/1988 | Muhr | 24/20 R |
| 4,944,475 | 7/1970 | Ono et al. | 248/71 |
| 4,987,652 | 1/1991 | Spaulding | 24/20 R |
| 5,024,405 | 6/1991 | McGuire | 248/73 |
| 5,048,462 | 9/1991 | Hostetler | 119/72 |
| 5,108,055 | 4/1992 | Kreinberg et al. | 248/71 |
| 5,133,523 | 7/1992 | Daigle et al. | 248/62 |
| 5,148,576 | 9/1992 | Dyer | 24/20 R |
| 5,150,927 | 9/1992 | Skinner | 285/189 |
| 5,157,815 | 10/1992 | Dyer | 24/270 |

Primary Examiner—Ramon O. Ramirez
Assistant Examiner—Korie H. Chan
Attorney, Agent, or Firm—Baker & Botts

[57] ABSTRACT

A reusable agricultural and industrial tie (10, 50, 200, 300, 400, 500, 600) for securing objects to a fixed structure, such as a tensile wire, and a wooden or metal structure. The reusable tie includes a head portion (14, 54, 202, 302, 402, 602) adapted for securely fastening onto the fixed structure, and a band (12, 52, 306, 406, 506, 606) having two ends coupled to the head portion and forming a generally annular cavity. A clamping assembly (16, 56, 304, 404, 504, 604) is formed in the ends of the generally annular band and has first (22, 62, 210, 310, 410, 510, 610) and second (24, 64, 212, 312, 412, 512, 612) interlocking members for adjustably, securely and fixedly clamping around the objects. The first interlocking member includes a single-contact-point biasing tongue (100, 220, 320, 420, 520, 620) defining an elongated opening (30, 70, 222, 322, 422, 522, 622) with a jaw member (28, 68, 216, 316, 416, 516, 616) with a predetermined number of teeth (32, 72, 218, 318, 418, 518, 618). The second interlocking member also includes a jaw member (38, 76, 106, 226, 326, 426, 426, 526, 626) with a predetermined number of teeth (42, 82, 228, 328, 428, 528, 628) and is adapted for insertion into the elongated opening and meshing with the jaw member of the first interlocking member. The tie may be easily installed with manual hand pressure and may be easily removed for reuse.

11 Claims, 6 Drawing Sheets

AGRICULTURAL AND INDUSTRIAL TIE

RELATED APPLICATION

This application is a continuation application of U.S. application Ser. No. 08/100,914, filed Aug. 2, 1993 by Michael Yu and entitled "Agricultural and Industrial Tie", now abandoned, which is a continuation-in-part of patent application Ser. No. 08/024,182, filed Feb. 26, 1993, entitled "Irrigation Hose Hanger" by Michael Yu now abandoned which is a continuation-in-part of patent application Ser. No. 07/991,727, filed Dec. 17, 1992, entitled "Irrigation Hose Hanger" by Michael Yu now abandoned, which is a continuation-in-part of patent application Ser. No. 07/924,191, filed Aug. 3, 1992, entitled "Irrigation Hose Hanger" by Michael Yu now abandoned, which is a continuation-in-part of application Ser. No. 07/834,149 filed Feb. 10, 1992, entitled "Irrigation Hose Hanger" by Michael Yu now abandoned.

TECHNICAL FIELD OF THE INVENTION

This invention relates in general to the field of ties and gatherers, and more particularly, to an agricultural and industrial tie.

BACKGROUND OF THE INVENTION

In the field of irrigation systems, the drip system has become one of the most popular water delivery method, especially in regions where rainfall is insufficient during the growing season. The drip system is advantageous over other irrigation methods mainly because it delivers water only to those spots where it is needed. Not only water consumption is decreased, but the crop benefits for a number of reasons. Incidents of mildew and other undesirable fungus is minimized since the water is only delivered to the feeder roots of each plant. Weeds in the field are also discouraged because of surface soil is mostly dry. The drip system is also the preferred irrigation method when the planting field is not level, such as a hillside.

In a conventional drip water delivery system, water is carried in drip hoses hanged below high tensile wires suspended approximately two feet above the ground. The drip hoses are hung above ground to prevent damage by farm equipment traffic and rodents. It is also easier to spot a plugged drip head when it is located above ground.

The drip hoses are generally not fixedly fastened to the high tensile wires and are merely hung below the wires. In some conventional systems, the devices used to hang the hoses are simply lengths of plastic with ends that will fasten together to form a loop. Other systems use minor variations of such device. Therefore in the conventional drip systems, the wire and the drip hose are loosely tied together and are free to move with respect to one another. The drip hose move due to a number of reasons. The drip hoses inevitably sag between where the hangers are used due to the weight of the water. The surge of water in the drip hoses may also cause some movements. The uneven field where the drip system is used may cause the hose to stretch and migrate downhill.

Displacement between the hangers and hoses may disadvantageously cause the drip heads to be moved away from the designated water delivery spots. The valleys created by sagging hoses may cause an accumulation of water and mineral deposits thus encourage the growth of algae and undesirable fungus, which may contribute to plugged drip heads. In addition, the hangers may become unevenly distributed and allow a majority of the weight of the hose and water to be unsupported. Thus, the drip hose connections may be pulled apart by the unsupported weight, and cause a leak in the system.

The industrial and commercial fields also employ and require a number of ties or gatherers for myriad purposes. Many kinds of ties are used in the automotive, aircraft and other industrial fields. A common desire is ease of use, ease of removal, strong holding capability and capability of reuse without reconditioning. Currently available ties do not fulfill all of these requirements.

Therefore, it has become desirable to provide an agricultural and industrial tie that advantageously functions as described above.

SUMMARY OF THE INVENTION

In accordance with the present invention, an irrigation hose hanger is provided which substantially eliminates or reduces disadvantages and problems associated with prior devices.

In an aspect of the invention, a reusable agricultural and industrial tie for securing objects to a fixed structure, such as a tensile wire, and a wooden or metal structure is provided. The reusable tie includes a head portion adapted for securely fastening onto the fixed structure, and a band having two ends coupled to the head portion and forming a generally annular cavity. A clamping assembly is formed in the ends of the generally annular band and has first and second interlocking members for adjustably, securely and fixedly clamping around the objects. The first interlocking member includes a single-contact-point biasing tongue defining an elongated opening with a jaw member with a predetermined number of teeth. The second interlocking member also includes a jaw member with a predetermined number of teeth and is adapted for insertion into the elongated opening and meshing with the jaw member of the first interlocking member.

In another aspect of the invention, the reusable agricultural and industrial tie includes a head portion which defines an opening and seat for accommodating a fastener adapted for securely fastening the tie to the fixed structure.

In yet another aspect of the invention, the head portion includes a flanged portion with one dimension longer than the second dimension. The flanged portion is adapted for insertion into an opening fabricated in the fixed structure. A slender neck portion is coupled between the flanged portion and the generally annular band.

In yet another aspect of the invention, the flanged portion of the head portion incorporates flexible structure so that its dimension may be reduced to be more easily inserted into the prefabricated openings.

In another aspect of the invention, the generally annular band actually defines an outer loop and at least one inner loop. The inner loop serves to exert adequate pressure on the objects clamped therein, and may expand to accommodate objects with increasing circumferences. Eventually the inner loop may collapse into the outer loop while still maintaining consistent pressure on the objects.

In yet another aspect of the present invention, apparatus for fastening an irrigation hose to a suspended wire is provided. The apparatus comprises a flexible band forming a substantially annular cavity. The band has two free ends to which are attached first and second interlocking members of a hose clamping assembly. A wire clamping member is formed integral to said band and located directly opposed to said hose clamping member.

An important technical advantage of the present invention provides an agricultural and industrial tie that is easily installed, reusable, and durable. Its uses are innumerable and may be adapted to many fields. The tie may be used to gather a bundle of wires and cables and securely attach them to a fixed structure such as a wood stud, a sheet of metal, etc. The tie may also be used to anchor tubing and hoses in a variety of applications. The agricultural, automotive, construction, and aircraft fields may all benefit from the adaptability of the tie.

BRIEF DESCRIPTION OF THE DRAWINGS

For a better understanding of the present invention, reference may be made to the accompanying drawing, in which.

DETAILED DESCRIPTION OF THE INVENTION

Figure 1:
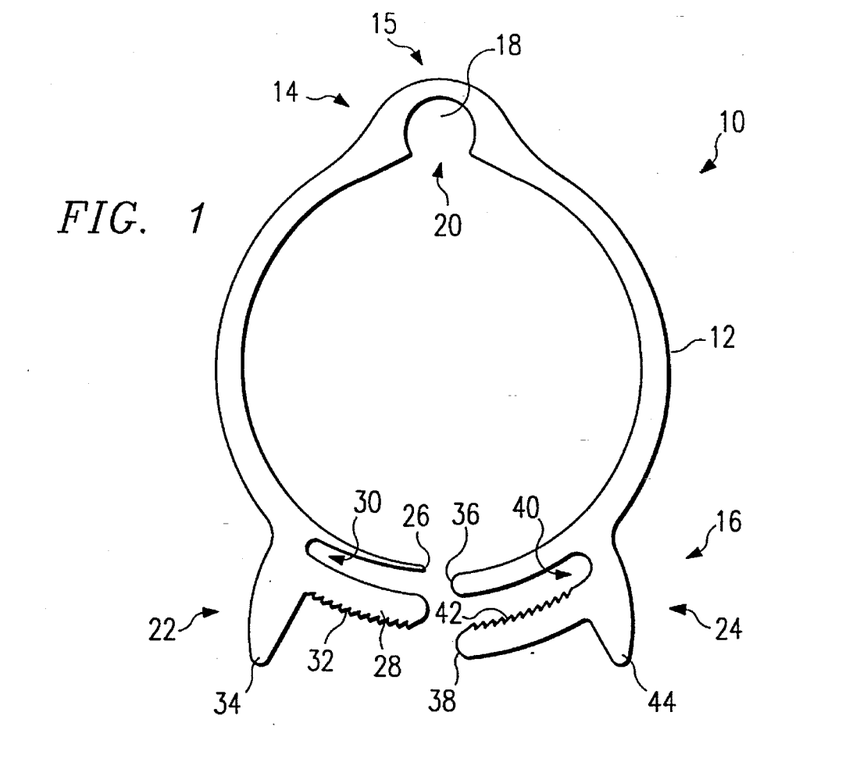
FIG. 1 is a side elevational view of the preferred embodiment of the present invention.

With reference to the drawings, FIG. 1 illustrates a preferred embodiment of an agricultural tie or irrigation hose hanger, indicated generally at 10 and constructed according to the teaching of the present invention. Hose hanger 10 includes a substantially annular open-ended band 12, a head portion including a wire clamping member 14 and a hose clamping assembly 16.

Wire clamping member 14 is formed substantially integral with band 12 and is located directly opposed to the open ends of band 12 and hose clamping assembly 16. Wire clamping member 14 includes a substantially annular cavity 18 formed in band 12 having an opening 20 of a dimension generally less than that of its diameter. The diameter of annular cavity 18 may be determined generally by the dimension of the high tensile wire (FIG. 2) hose hanger 10 is designed to accompany. Since wire clamping member 14 is adaptable to be fixedly and securely clamped onto the wire upon the complete closure of hose clamping assembly 16, the diameter of annular cavity 18 is generally similar with that of the wire, so that wire clamping member 14 is capable of fastening tightly to the wire. Wire clamping member 14 preferably includes a flat surface (FIGS. 3 and 4) to facilitate the clamping operation by allowing force to be exerted evenly in a downward direction. Constructed in this manner, the operator may use his/her thumb to push hose hanger 10 down and onto a wire with ease.

Hose clamping assembly 16 includes two interlocking members 22 and 24 located on the open ends of band 12. Interlocking member 22 includes a tongue 26 and a jaw member 28 forming an elongated and open-ended cavity 30. On the surface of jaw member 28 directed away from band 12 are a set of substantially triangular teeth 32 pointed generally away from interlocking member 24. A lever 34 protrudes from where the open end of band 12, tongue 26, and jaw member 28 joins, and projects away from band 12.

Interlocking member 24 is constructed similarly to interlocking member 22 and includes a tongue 36 and jaw member 38. Tongue 36 of interlocking member 24 is generally somewhat thicker than tongue 26 of interlocking member 22, and is also joined to jaw member 38 to form an elongated and open-ended cavity 40. The surface of jaw member forming one side of cavity 40 are a second set of substantially triangular teeth 42 pointed generally away from interlocking member 22. Additionally, interlocking member 24 includes a lever 44.

In operation, the preferred embodiment of hose hanger 10 is designed and constructed so that teeth 42 of jaw member 38 meshes and interlocks teeth 32 of jaw member 28 when interlocking members 22 and 24 are pushed toward one another by pressing on levers 34 and 44. As such, cavity 30 is adapted to receive tongue 36, and both tongues 26 and 36 act to bias jaw member 28 toward jaw member 38 to ensure a tight lock. It is apparent that no tools are required to press interlocking members together since levers 34 and 44 provide sufficient leverage for pressure exerted by human fingers. It is also apparent that hose hanger 10 may accommodate hoses within a range of sizes.

Figure 2:
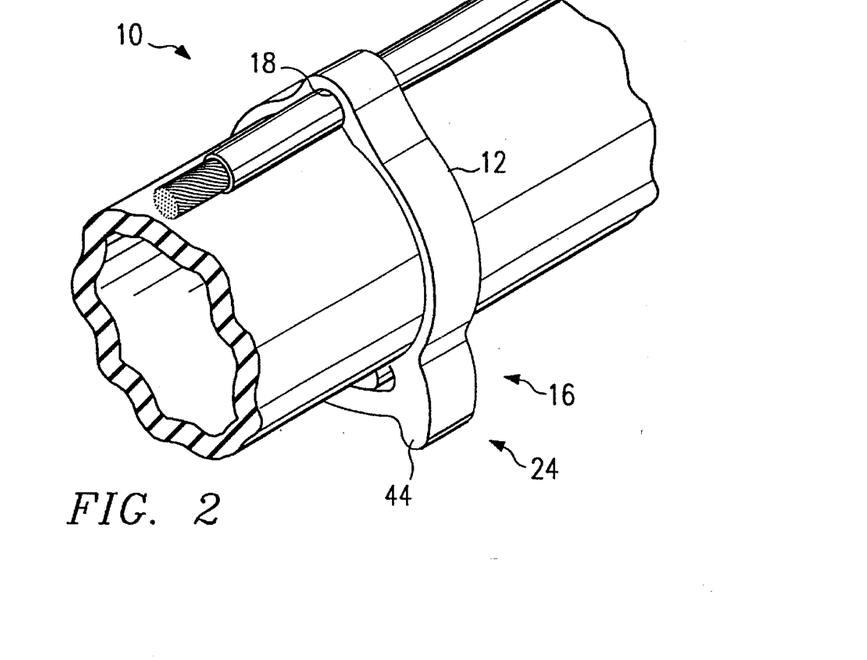
FIG. 2 is a perspective view of the preferred embodiment of the present invention shown securely fastening a length of a drip hose to a wire.

Referring to FIG. 2, hose hanger 10 is shown where wire clamping member 14 is securely fastened to a wire and hose clamping assembly is securely attached to a hose. Teeth 32 of jaw member 28 is engaged with teeth 42 of jaw member 38 thus effecting a secure hold on the hose. Note that in order to securely fasten hose hanger 10 to the hose, levers 34 and 44 are pressed toward one another until band 12 is tightly wrapped around the full circumference of the hose. It can be seen that as the wire is positioned into the slightly smaller circumference of the wire clamping member 14, the memory of the plastic will enable the wire to be held securely. As the hose clamping assembly is secured around a hose, the wire clamping member 14 is forced tightly around the wire. This structure and function enables a fixed relation between the wire and the hose, thus ensures a stable installation.

Figure 3:
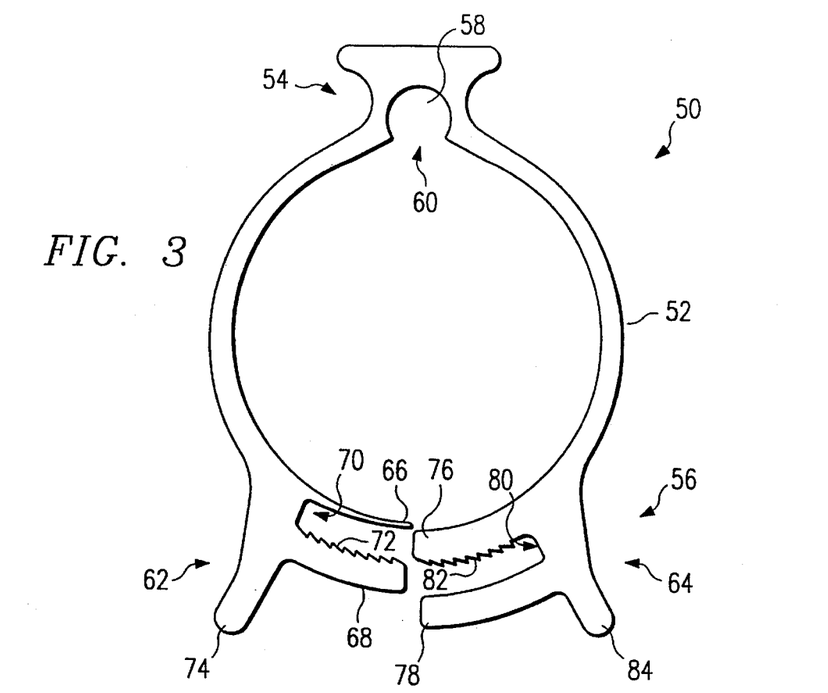
FIG. 3 is a side elevational view of another preferred embodiment of the present invention.

Referring to FIG. 3, yet another embodiment of the hose hanger 50 is shown. Hose hanger 50 includes a flexible annular band 52, a wire clamping member 54, and a hose clamping assembly 56. Wire clamping member 54 is generally like that of embodiment 10 as shown in FIG. 1, but has additionally a flattened top to facilitate the exertion of downward force that enables cavity 58 and opening 60 to clamp around a wire. In addition, hose clamping assembly 56 includes interlocking members 62 and 64 constructed in a slightly different manner than that of hose hanger 10. Interlocking member 62 includes a biasing tongue 66 and a jaw member 68 forming an elongated open-ended cavity 70. Jaw member 68 has generally triangular teeth 72 pointing generally toward wire clamping member 54. In addition, a lever 74 joining tongue 66, jaw member 68 and band 52 is provided. Interlocking member 64 includes a jaw member 76 having teeth 82 pointing toward jaw member 68 and a biasing tongue 76. Jaw member 76 and tongue 78 define another elongated opening 80. Teeth 82 and teeth 72 of jaw members 76 and 68 are constructed so that they are capable of meshing and interlocking easily. Another biasing tongue 78 is provided. Tongues 66 and 78 function to force jaw members 68 and 76 toward one another so that they stay interlocked when hose hanger 52 is in use. Levers 74 and 84 facilitate the exertion of opposing forces to close hose clamping assembly 56 around a hose so that jaw member teeth 72 interlock with jaw member teeth 82. It has been shown that biasing tongue 78 is optional, the absence of which does not adversely affect the operation of the hose hanger 50.

Referring to FIGS. 4 and 4a–c, various embodiments of compression nodes and ridges are shown. Compression nodes and ridges are formed along the inner surface of the annular band 52 to add additional gripping strength and the capacity to adapt to possible varying circumferences of irrigation hoses.

Figure 4:
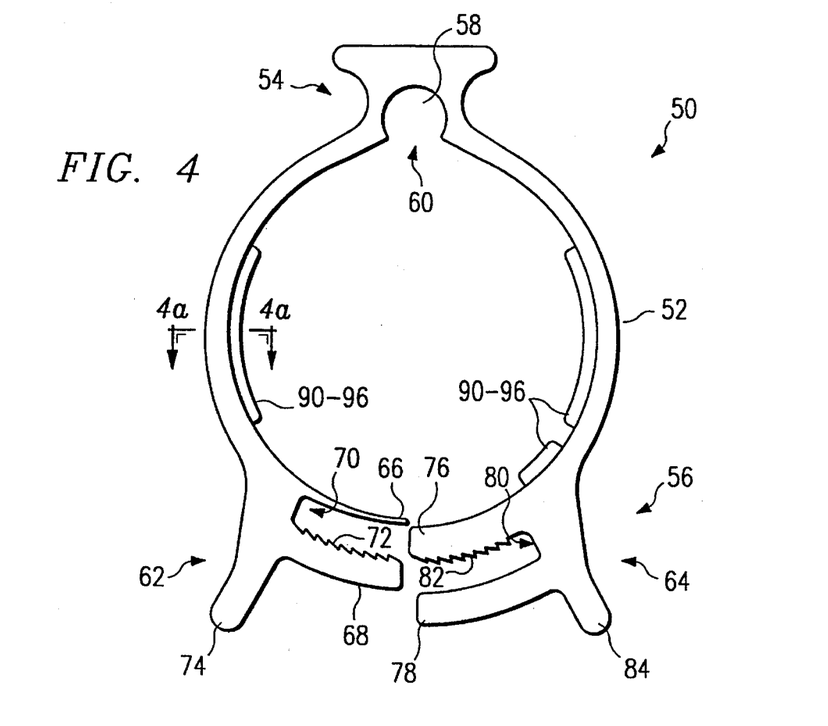
FIGS. 4a–c are views of a compression ridge.
Figure 4A:
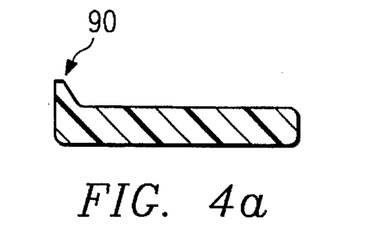
Figure 4B:
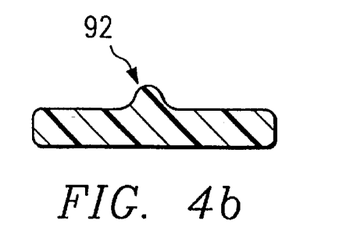
Figure 4C:
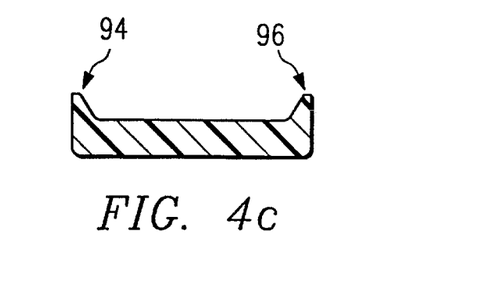

In FIG. 4a, one edge along the inner surface of annular band 52 is made to protrude toward the center of the ring. The amount of profusion, effectively forming a ridge 90, may be approximately 0.5 mm tall. FIG. 4b shows yet another embodiment 92 of the compression ridge, formed approximately midway of the width and along the inner surface of the annular band 52. FIG. 4c shows ridges 94 and 96 formed along both edges of the band toward the center of the ring.

In operation, the compression nodes (a shortened version of a ridge) and ridges 90–96 help the flexible annular band 52 to conform tightly around the irrigation hose. Because of variations in the circumference of hoses, the mere spacing of the teeth 72 may be inadequate to clamp tightly around the hose. In other words, when the clamp may be too loose around the hose when the first three sets of teeth are meshed, for example, and yet the fourth set of teeth cannot be forced to engage, compression nodes and ridges 90–96 take up the slack. This is an important feature where tight fastening is desired. Compression ridges and nodes may be incorporated in any of the embodiments shown in FIGS. 1, 3, 5–10, if desired.

Figure 5:
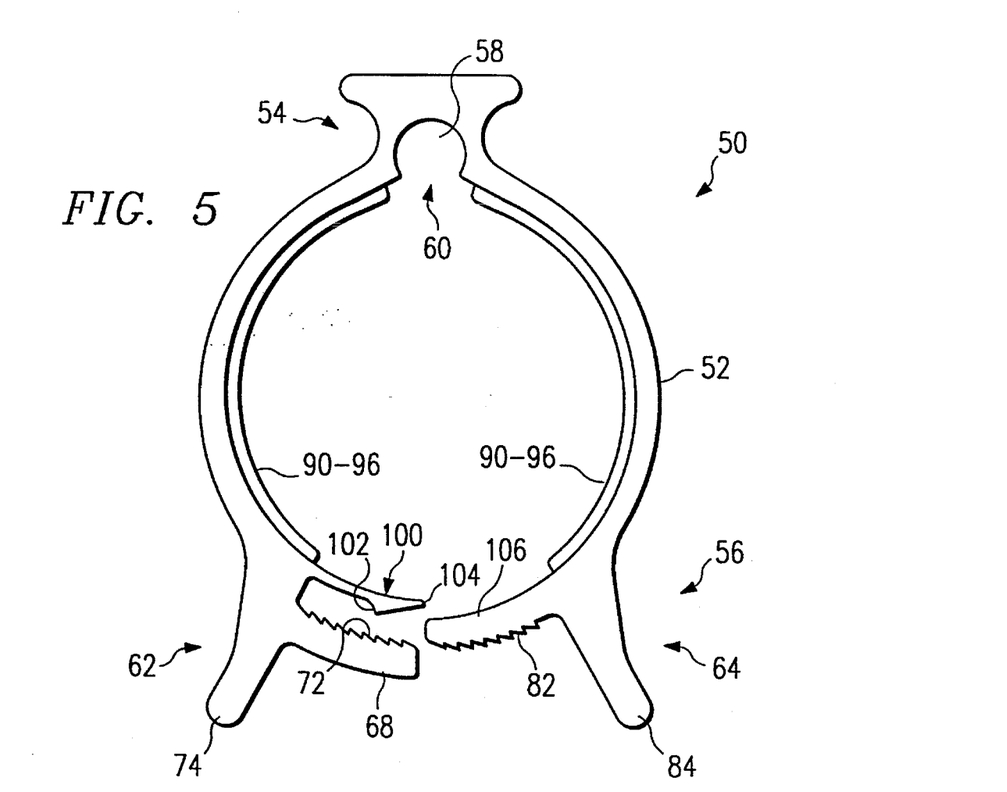
FIG. 5 is a side elevational view of another preferred embodiment of the irrigation hose hanger.

Referring to FIG. 5, yet another preferred embodiment of the irrigation hose hanger 50 is shown. Like reference numerals are used to refer to like parts in FIGS. 4 and 5. Hose hanger 50 has an annular band 52 with at least one compression ridge 90–96 formed along an inner surface thereof, and a hose clamping assembly 56. The wire clamping member 54 is adapted to tightly grip a wire of the size commonly used in the field of drip irrigation. Preferably, the diameter of wire clamping member 54 is only slightly less than that of the irrigation wires. Since the hose clamping assembly 56 is integral with the wire clamping member 54, when the annular band 52 is securely fastened around the hose by engaging the hose clamping assembly 56, the wire clamping assembly 54 is forcibly and tightly clamped around the wire.

Unlike the embodiments shown in FIGS. 3 and 4, the hose clamping assembly 56 of the embodiment shown in FIG. 5 is modified to facilitate hose installation and removal or reuse. Interlocking member 62 preferably includes a jaw member 68 and a single-contact-point biasing tongue 100. Jaw member 68 includes generally triangular teeth 72 pointing toward the biasing tongue 100. Single-contact-point biasing tongue 100 has a protruding contact point 102 pointing toward jaw member 68. The biasing tongue 10 then tapers off into a point 104. Preferably, jaw member 68 of the embodiment shown in FIG. 5 is made stiffer than the other embodiments by slightly increasing the thickness thereof. A lever 74 is further provided to facilitate manual installation of the irrigation hose hanger 50.

Interlocking member 64 includes a jaw member 106 with generally triangular teeth 82. Comparing FIGS. 4 and 5, it is readily apparent that biasing tongue 78 is missing from the embodiment shown in FIG. 5 as it has been advantageously removed. Furthermore, jaw member 106 is made slightly thinner to facilitate its entry between single-contact-point biasing tongue 100 and jaw member 68, and its engagement with jaw member 68. Similarly, a lever 84 is provided to facilitate manual installation.

Implemented in this manner, the installation of irrigation hose hanger 50 is made substantially easier. As jaw members 68 and 106 are pressed together by manual pressure on levers 74 and 84, the single-contact-point biasing tongue 100 concentrates the pressure on jaw member 106 at one point at the forward position near its end 104. The single contact point 102 of biasing tongue 100 thus applies nearly the same pressure to jaw member 106 during the entire teeth engaging process. Additionally, since jaw member 106 is made thinner, it is more flexible and generates less friction between teeth 72 and 82 when they are being engaged. This preferred embodiment also facilitates the disengaging of jaw members 68 and 106 since biasing tongue 78 has been omitted. The clamping assembly may be disengaged by sliding the two sets of teeth sideways past each other until the teeth are no longer engaged. Because of the projected long life of the irrigation hose hanger of the instant invention, the hangers can be easily reused and adapted to changing applications.

Although hose hangers 10 and 50 are preferably constructed of a variety of injection moldable plastic or thermoplastic materials, other materials that possess similar advantageous properties may also be used. The material should be selected to provide sufficient rigidity yet flexibility to perform for the utility as herein described. Preferably, the material is resistant to ultraviolet light radiation, to further prolong the projected life of the hangers.

Figure 6A:
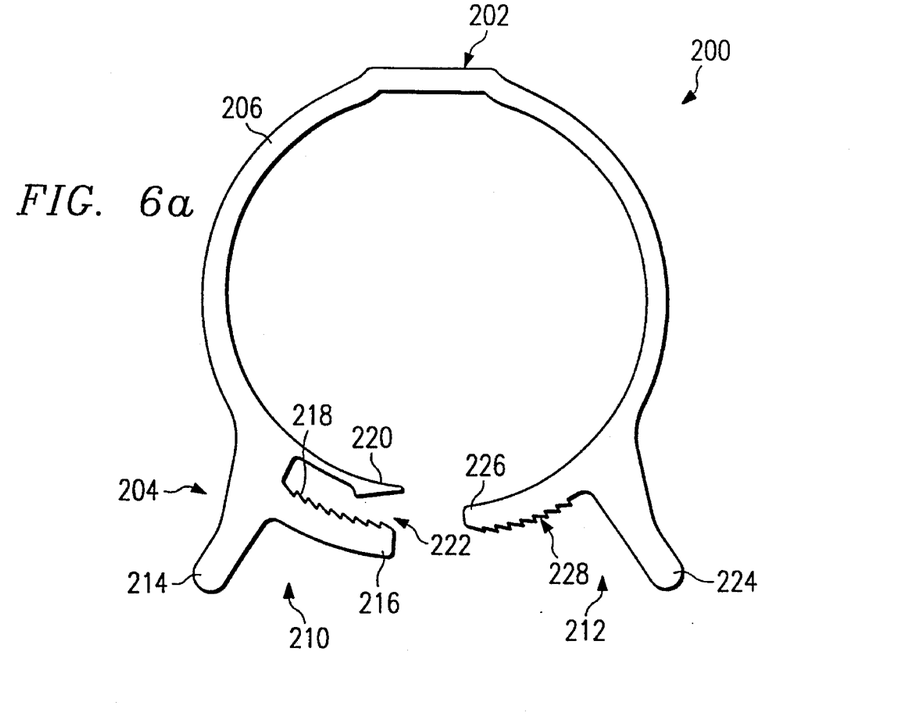
FIG. 6a is a side elevational view of a screw-on tie.
Figure 6B:
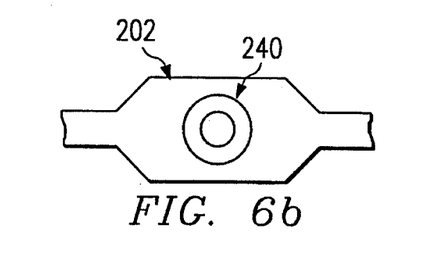
FIG. 6b is a view showing the details of the screw seat.
Figure 6C:
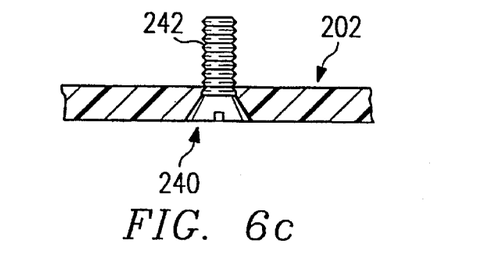
FIG. 6c is a cross-sectional side view showing the details of the screw seat.

Referring to FIG. 6a, an embodiment of an industrial tie 200 is shown. Industrial tie 200 is adapted to be screwed or secured onto an underlying structure (not shown). Such structure may be constructed of wood, sheet metal, or any other material that may admit such fasteners. Screw-on tie 200 includes a flat screw seat portion 202, alternative detailed views of which are shown in FIGS. 6b and 6c and described in detail below. Screw-on tie 200 also includes a band 206 connecting the screw seat portion 202 to clamping assembly 204. Clamping assembly 204 includes two interlocking members 210 and 212 located on the open ends of band 206. When not in use, it is preferable that interlocking members 210 and 212 define an opening approximately ten millimeters. The wider opening facilitates the fastening of the screw through screw seat portion 202 and onto the underlying structure.

Interlocking members 210 and 212 are substantially similar to that described above in connection with the hose hanger. Interlocking member 210 includes a lever 214 and a jaw member 216. Jaw member 216 defines a set of triangular teeth 218 pointing toward the center of the tie 200. Interlocking member 210 further includes a single-contacting-point biasing tongue 220 which defines an opening 222 with jaw member 216. Interlocking member 212 also includes a lever 224 and a jaw member 226 with substantially triangular teeth 228 pointing away from the center of the tie 200. Accordingly, opening 222 is adapted to accommodate jaw member 226 as interlocking members 210 and 212 are forced toward one another by pinching levers 214 and 224. As discussed above, an insignificant amount of force is required to lock members 210 and 212. The force exertable by an adult thumb and an index finger is sufficient to complete this task and no other tools are needed.

As shown in FIG. 6b, screw seat portion 202 is substantially wider and slightly thicker than the band 206. Screw seat portion 202 defines a through hole 240 for accepting and seating a fastener or screw 242. The through hole 204 and screw seat portion 202 may be constructed to accommodate a number of commonly used screw sizes, or may be specially manufactured to accommodate specially sized screws and other fasteners.

Screw-on tie 200 may be constructed of plastics incorporating appropriate ultraviolet resistant materials so that it is also suitable for outdoor use. Screw-on tie 200 may be advantageously used wherever a secured gatherer is needed. For example, it may be desirable to gather up a number of electrical wires and fasten them to the wall of a structure. It may also be used to secure hoses used in automobiles and aircraft since the secure fastening of interlocking members 210 and 212 can withstand vibration common in such applications.

Figures 7A, 7B:
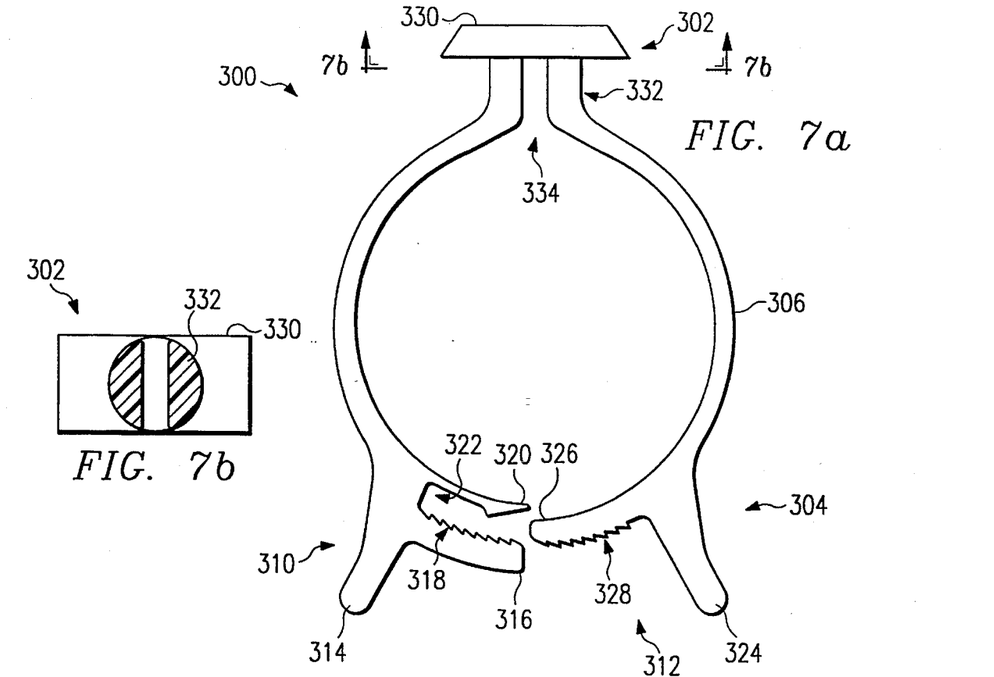
FIG. 7a is a side elevational view of a flat head tie.
FIG. 7b is a detailed cross-sectional view of the rectangular head along line 7b—7b.

Referring to FIGS. 7a and 7b, a flat head tie 300 is shown. Flat head tie 300 includes a head portion 302 and a clamping assembly 304 connected therewith via a band 306. Clamping assembly 304 is constructed and functions similarly as that of screw-on tie 200, and includes interlocking members 310 and 312. Interlocking member 310 includes a lever 314, jaw member 316 with teeth 318, and single-contact-point biasing tongue 320. Single-contact-point biasing tongue 320 and jaw member 316 also define an opening 322. Interlocking member 312 includes a lever 324 and jaw member 326 with teeth 328.

Head portion 302 includes a generally rectangular head 330 with sloping sides, where the top thereof has a smaller surface area than its base, as shown. The base of head portion 302 is coupled to a cylindrical neck 332, which also defines an opening 334 toward the center of the tie 300. The purpose of the head portion structure 302 is to allow rectangular head 330 to be inserted into a slightly larger and similarly proportioned rectangular opening in an underlying structure (not shown), such as a sheet of metal. Head portion 302 and the entire tie 300 may then be rotated ninety degrees, making its lengthier side butt up against the shorter dimension of the rectangular opening. Wires, cables, hoses, tubes (rigid and flexible) and other items may then be accommodated and securely fastened within the center of band 306 by locking clamping assembly 304. The wires, etc. fastened therein also serves to prevent head portion 302 from rotating and exiting the rectangular opening.

The advantage of flat head tie 300 lies in its minimal space requirement for the head portion 302, so that it may be adequately inserted between two sheets of metal which are positioned two to three millimeters apart. Constructed in this manner, flat head tie 300 is still capable of withstanding strong pull exerted on its head portion 302. A secure anchor is thus provided for securing the wires, cables, and hoses. The locked clamping assembly 324 has great holding strength and cannot easily be pulled apart. As discussed above, clamping assembly 324 may be interlocked by manual force only.

Figure 8A:
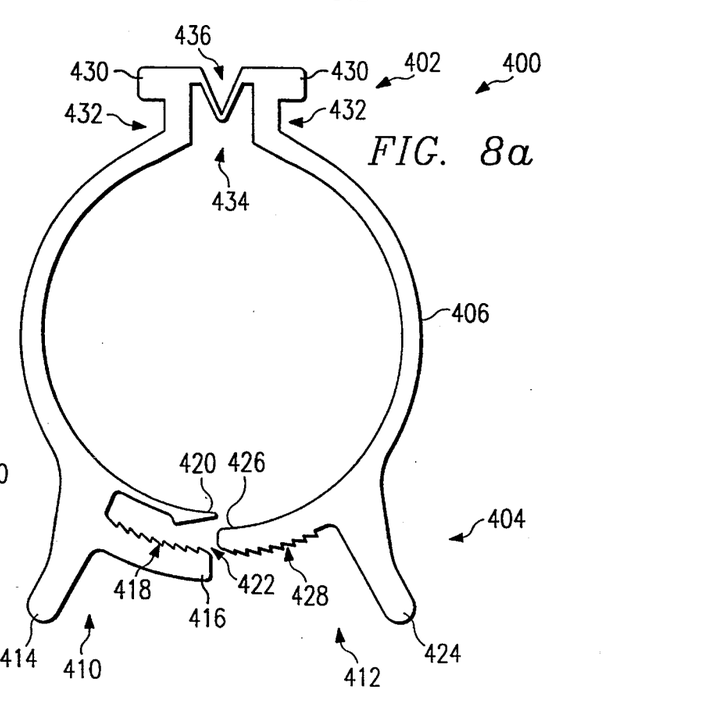
FIG. 8a is a side elevational view of a flexible link tie.
Figure 8B:
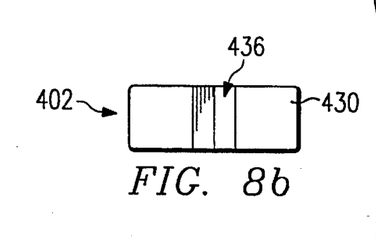
FIG. 8b is a top detailed view of the flexible head.

Referring to FIGS. 8a and 8b, another embodiment 400 of an industrial tie is shown. Flexible link tie 400 includes a head portion 402 and a clamping assembly 404 coupled with a band 406. For ease of discussion, clamping assembly 404 is constructed and functions similarly as that of other industrial ties already described, and details of which will not be repeated herein. However, flexible link tie 400 incorporates an uniquely fashioned head portion 402. Head portion 402 includes outwardly extending tabs 430 coupled to one another by a more slender V-shaped link 436. The tabs 430 are coupled directly to a neck portion 432 and the band 406 as shown. The V-shaped link 436 allows a flexible connection between tabs 430 so that they may be easily displaced toward one another by manual force.

In operation, tabs 430 may be squeezed together thus reducing its dimension, tabs 430 may then be inserted into a smaller opening previously made in an underlying structure (not shown) that is no smaller than the dimensions of neck portion 432. Once inserted, the force on tabs 430 are released to permit them to return to their original position, thus expanding beyond the opening in the structure. Once wires, hoses, cables, tubes are clamped between interlocking members 410 and 412, any rotational movement of the tie 400 is reduced. The wires, etc. also serve to prevent accidental removal of flexible link head portion 402 from the opening since access thereto is made impossible. The filled capacity of tie 400 will also prevent tabs 430 or neck 432 from being squeezed together, further reducing the possibility of accidental removal.

Figure 9:
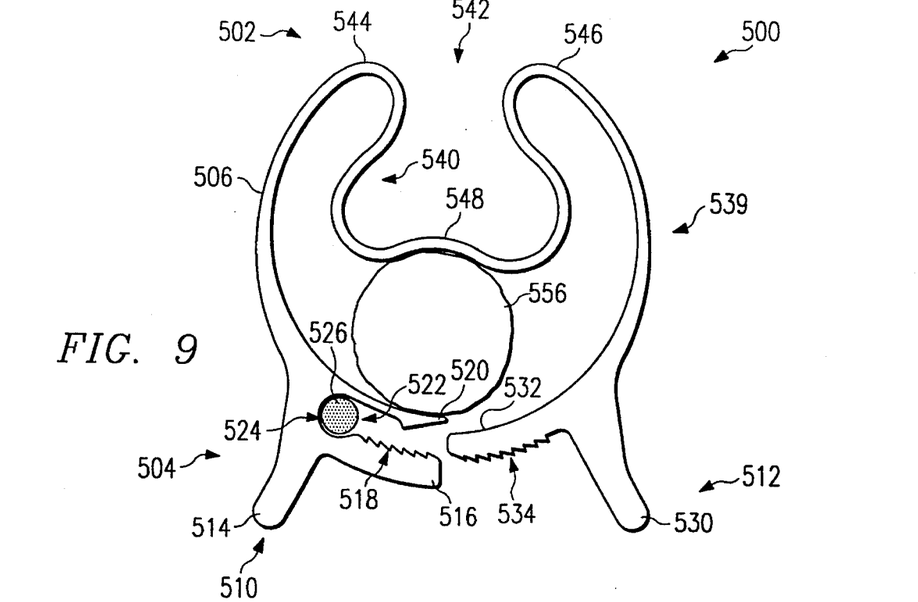
FIG. 9 is a side elevational view of an expandable tie.

Referring to FIG. 9, an embodiment of an expandable tie 500 is shown. Expandable tie 500 includes a flexible and pre-shaped loop 502 coupled to a clamping assembly 504. Clamping assembly is substantially similar as that discussed above with one exception. Opening 522 includes a slightly enlarged and round opening 524 where jaw member 516 is coupled to single-contact-point biasing tongue 520. Round opening 524 may be used to accommodate a tensile wire 524, as shown. If desirable, opening 524 may be incorporated in embodiments shown in FIGS. 1 3–8a, 10.

Uniquely shaped loop 502 is formed by shaping a substantially flexible band 506. The material used for band 506 is preferably one with good memory. Good memory describes the characteristic in materials which enable the shaped device to return substantially to its original shape after being bent or deformed. Loop 502 includes an outer loop 539 and at least one inner loop 540. Outer loop 539 additionally includes two lobes 544 and 546, which generally define an opening 542 that forms the inner loop 540. FIG. 9 clearly shows this unique shape and structure. When an object 556, such as a tree branch, is inserted and clamped within loop 502 as shown, a portion 548 of inner loop 540 comes into intimate contact with tree branch 556, as well as some portions of outer loop 539 and clamping assembly 504. The force exerted by inner loop 540 is sufficient to secure expandable tie 500 to tree branch 556 to discourage displacement. As the diameter of the tree branch 556 increase because of growth, inner loop 540 expands accordingly to continuously exert substantially the same amount of pressure thereon. It is further contemplated that inner loop 540 may include multiple smaller inner loops (not shown) that function in the similar manner to exert measured and substantially unvarying pressure on the tree branch. A multiple inner loop design provides slightly more flexibility with less tension. The tension of the expandable loop is determined by the nature of the chosen plastic, the shape and design of inner loop(s) 540, the size of opening gap 542, and the width and thickness of loop 502.

When used in an orchard, expandable tie 500, with its accommodation of the tensile wire 526, may be advantageously used for training the tree branches into certain angles. Such applications may be employed to control the branch and foliage growth, and to obtain optimum fruiting ratios. In a vineyard, expandable tie 500 may be used to guide the growth of the vine for easy management and to help support the increasing weight of the grapes. Since expandable tie 500 is adaptable to gradually expand and accommodate the vigorous growth of trees and vines, no adjustment or retying is necessary as with conventional ties. As the tree or vine grows in circumference, inner loop 540 gradually expands and eventually collapses to become part of outer loop 539. The maximum circumference will include the total length of outer loop 539 and inner loop 540. The material of expandable tie 500 may be selected for its memory and ultraviolet resistant characteristics.

Other contemplated uses include the application of stock identification, such as aplied to ostriches and other domesticated animals. Color coded expandable tie 500 may be installed on the leg of an ostrich chick, which may be used to identify and mark the sex of the bird, age, identification number and other data. Expandable tie 500 will expand gradually with the growing bird, thereby obviating the troublesome need to adjust or fasten larger ties as it grows. Other uses also include any application that needs the flexible capacity of expandable tie 500 to accommodate varying sizes of objects. A non-expandable version of tie 500 may include a single circular loop without inner loop 540.

Figure 10:
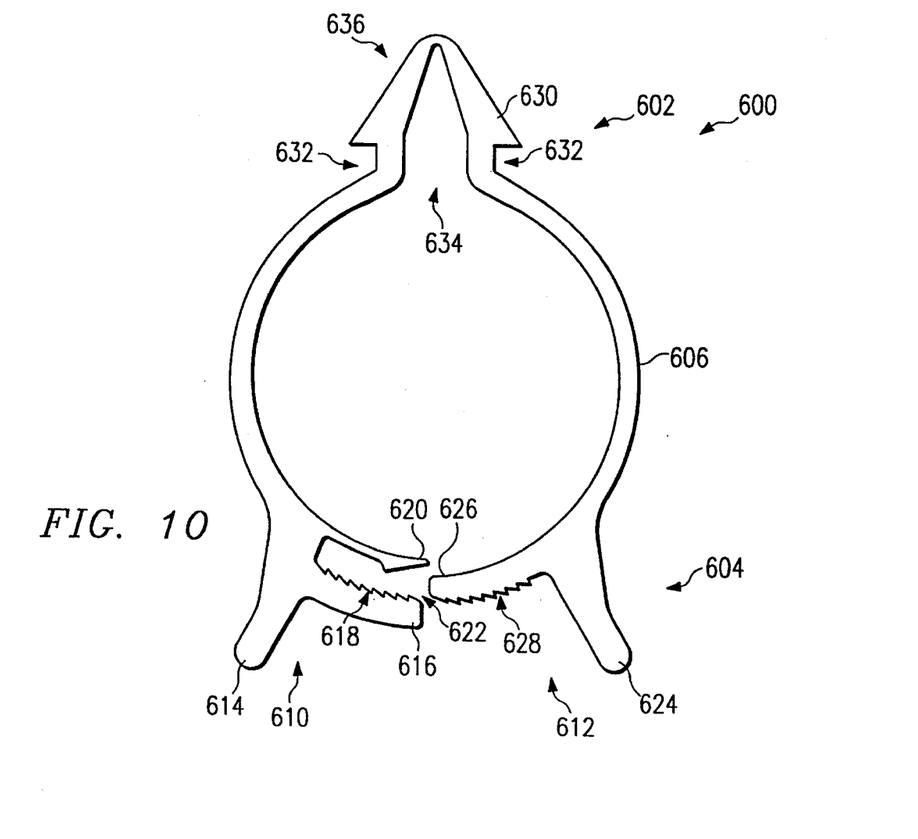
FIG. 10 is a side elevational view of a spear head tie.

Referring to FIG. 10, a spear head tie 600 is shown. Spear head tie 600 includes a head portion 602 coupled to a clamping assembly 604 with a band 606. Clamping assembly 604 is constructed and functions similarly as those discussed above. Head portion 602 includes a substantially triangularly-shaped head 630 with a narrow neck 632. Triangularly-shaped head 630 is substantially hollow and defines an opening 634 toward the center of tie 600. Opening 634 permits the sides of head 630 to be squeezed together to reduce the dimensions thereof for insertion into a prefabricated slot or opening. The flanges and neck 632 allows tie 600 to be substantially secured against the walls of the slot. For further assurance, the slot or opening may be made such that the final position of tie 600 is ninety degrees from its insertion position. Wires, cables, hoses, and other objects clamped by tie 600 further discourages any rotational displacement and extraction. The uses of tie 600 includes those contemplated for flat head tie 300 and flexible link tie 400, and may be advantageously used accordingly.

Although the present invention has been described in detail, it should be understood that various changes, substitutions and alterations can be made thereto without departing from the spirit and scope of the present invention as defined by the appended claims.

What is claimed is:

1. A reusable tie for securing at least one object to a fixed structure, comprising:

a head portion adapted for securely fastening onto said fixed structure;

a first and second annular band portions integrally coupled to said head portion, said annular band portions extending from said head portion and forming a substantially annular cavity, said annular band portions further including at least one compression ridge extending along an inner surface of said band portions;

a first jaw member integrally coupled to said first annular band portion and having a plurality of teeth pointing toward said annular cavity;

a single-contacting-point biasing tongue coupled to said first clamping jaw member and defining an elongated opening therewith, said single-contact-point biasing tongue extending from said first jaw member and having a generally triangular point pointing generally away from said annular cavity and toward to said elongated opening; and a second jaw member integrally coupled to said second annular band portion and having a plurality of teeth pointing away from said annular cavity, said teeth of said second jaw member being adapted for meshing with said teeth of said first jaw member as said second jaw member enters said elongated opening, said single-contact-point biasing tongue urging said teeth of said jaw members together by applying pressure at a single point.

2. The reusable tie, as set forth in claim 1, wherein said head portion defines an opening and seat for accommodating a fastener adapted for securely fastening said tie to said fixed structure.

3. The reusable tie, as set forth in claim 2, wherein said head portion includes a flattened portion being substantially thicker and wider than said annular band portions.

4. The reusable tie, as set forth in claim 1, wherein said head portion comprises:

a flange having a first dimension longer than a second dimension for insertion into an opening fabricated in said fixed structure; and a slender neck portion coupled between said flange and said annular band portions.

5. The reusable tie, as set forth in claim 4, wherein said flange is generally flat and rectangular.

6. The reusable tie, as set forth in claim 4, wherein said flange comprises:

a flexible link; and first and second tabs coupled to one another by said flexible link, said flexible link permitting displacement of said first and second tabs toward one another when force is exerted thereon.

7. The reusable tie, as set forth in claim 6, wherein said flexible link includes a thinner V-shaped connecting portion between said first and second tabs.

8. The reusable tie, as set forth in claim 4, wherein said flange includes a generally spear-shaped portion coupled to said slender neck portion, said neck portion and spear-shaped portion defining a connected opening integral with said cavity defined by said annular band portions for permitting a reduction of its dimensions when force is exerted thereon.

9. The reusable tie, as set forth in claim 1, wherein said annular band portions further include:

an outer loop; and at least one inner loop being capable of expanding to accommodate changing dimensions in said objects clamped therein, and eventually collapsing into said outer loop, said inner loop being adapted to exert generally consistent pressure on said objects clamped therein during said expansion.

10. The reusable tie, as set forth in claim 1, said first jaw member and single-contact-point biasing tongue further defines an opening therebetween for accommodating a tensile wire.

11. The reusable tie, as set forth in claim 1, further comprising first and second levers coupled respectively to said first and second jaw members.

\* \* \* \* \*